(12) United States Patent
Noy et al.

(10) Patent No.: US 8,929,372 B2
(45) Date of Patent: *Jan. 6, 2015

(54) GRID ROUTER

(75) Inventors: Ariel Noy, Herzliya (IL); Ron Sidi, Bat Yam (IL); Sharon Barkai, Los Altos, CA (US)

(73) Assignee: ConteXtream Ltd., Petach-Tikva (IL)

( * ) Notice: Subject to any disclaimer, the term of this patent is extended or adjusted under 35 U.S.C. 154(b) by 143 days.

This patent is subject to a terminal disclaimer.

(21) Appl. No.: 11/927,861

(22) Filed: Oct. 30, 2007

(65) Prior Publication Data

US 2009/0109968 A1  Apr. 30, 2009

(51) Int. Cl.
| | |
|---|---|
| *H04L 12/28* | (2006.01) |
| *H04L 12/743* | (2013.01) |
| *H04L 12/701* | (2013.01) |
| *H04L 12/775* | (2013.01) |
| *H04L 12/773* | (2013.01) |
| *H04L 12/931* | (2013.01) |

(52) U.S. Cl.
CPC ............ *H04L 45/7453* (2013.01); *H04L 45/00* (2013.01); *H04L 45/58* (2013.01); *H04L 45/60* (2013.01); *H04L 49/355* (2013.01)
USPC .......................................... 370/392; 370/412

(58) Field of Classification Search
USPC ......... 370/389, 392, 395, 289, 428, 471, 474, 370/412, 413, 229; 709/221, 227
See application file for complete search history.

(56) References Cited

U.S. PATENT DOCUMENTS

| | | | |
|---|---|---|---|
| 5,640,399 A | * | 6/1997 | Rostoker et al. ............... 370/392 |
| 6,216,173 B1 | | 4/2001 | Jones et al. |
| 6,452,915 B1 | | 9/2002 | Jorgensen |
| 6,538,992 B1 | | 3/2003 | Subbiah et al. |
| 6,603,738 B1 | | 8/2003 | Kari et al. |
| 6,687,247 B1 | | 2/2004 | Wilford et al. |
| 6,959,335 B1 | | 10/2005 | Hayball et al. |
| 7,013,084 B2 | | 3/2006 | Battou et al. |
| 7,075,919 B1 | | 7/2006 | Wendt et al. |
| 7,190,696 B1 | | 3/2007 | Manur et al. |
| 7,327,748 B2 | | 2/2008 | Montalvo et al. |

(Continued)

FOREIGN PATENT DOCUMENTS

| | | |
|---|---|---|
| EP | 1345366 | 9/2003 |
| EP | 1418715 | 5/2004 |

(Continued)

OTHER PUBLICATIONS

International Search Report Dated Mar. 9, 2009 From the International Searching Authority Re.: Application No. PCT/IL2008/001424.

(Continued)

*Primary Examiner* — Dang Ton
*Assistant Examiner* — Mandish Randhawa

(57) ABSTRACT

A grid router includes a plurality of external interface units to receive packets of services from one point and to provide packets of services to another point and a second plurality of mailbox units to store and forward the packets associated with mailboxes, one per service. Each mailbox unit is connected to each external interface unit. The units are implemented on PCs (personal computers) having memory controllers and move the packets through the router close to or at the I/O (input/output) rate of the memory controllers.

4 Claims, 9 Drawing Sheets

(56) References Cited

U.S. PATENT DOCUMENTS

| | | | |
|---|---|---|---|
| 7,369,574 B1* | 5/2008 | Parruck et al. | 370/474 |
| 7,835,357 B2 | 11/2010 | Panwar et al. | |
| 2002/0031135 A1 | 3/2002 | Inoue | |
| 2002/0036984 A1 | 3/2002 | Chiussi et al. | |
| 2002/0049901 A1 | 4/2002 | Carvey | |
| 2003/0046336 A1 | 3/2003 | D'Annunzio et al. | |
| 2003/0058878 A1 | 3/2003 | Minnick et al. | |
| 2003/0061296 A1 | 3/2003 | Craddock et al. | |
| 2003/0093463 A1 | 5/2003 | Graf | |
| 2003/0123449 A1 | 7/2003 | Kuhl et al. | |
| 2003/0149773 A1 | 8/2003 | Harbin et al. | |
| 2003/0161303 A1* | 8/2003 | Mehrvar et al. | 370/386 |
| 2003/0198241 A1 | 10/2003 | Putcha et al. | |
| 2003/0214954 A1 | 11/2003 | Oldak et al. | |
| 2004/0001499 A1 | 1/2004 | Patella et al. | |
| 2004/0042448 A1* | 3/2004 | Lebizay et al. | 370/362 |
| 2004/0071164 A1 | 4/2004 | Baum | |
| 2004/0120261 A1 | 6/2004 | Ovadia et al. | |
| 2004/0163084 A1 | 8/2004 | Devadas et al. | |
| 2004/0223497 A1 | 11/2004 | Sanderson et al. | |
| 2004/0233845 A1 | 11/2004 | Jeong et al. | |
| 2005/0025051 A1 | 2/2005 | Roeder | |
| 2005/0063392 A1 | 3/2005 | Ofuji et al. | |
| 2005/0141426 A1 | 6/2005 | Hou | |
| 2005/0175014 A1 | 8/2005 | Patrick | |
| 2005/0210479 A1* | 9/2005 | Andjelic | 719/321 |
| 2005/0226216 A1 | 10/2005 | Oyama et al. | |
| 2006/0007935 A1 | 1/2006 | Bennett et al. | |
| 2006/0034239 A1* | 2/2006 | Abeta et al. | 370/341 |
| 2006/0129676 A1* | 6/2006 | Modi et al. | 709/227 |
| 2006/0159078 A1 | 7/2006 | Konda | |
| 2006/0251109 A1 | 11/2006 | Muller et al. | |
| 2007/0015525 A1* | 1/2007 | Beming et al. | 455/509 |
| 2007/0058548 A1 | 3/2007 | Babonneau et al. | |
| 2007/0121499 A1 | 5/2007 | Pal et al. | |
| 2007/0153697 A1 | 7/2007 | Kwan et al. | |
| 2007/0165529 A1 | 7/2007 | Nakamura et al. | |
| 2007/0220059 A1 | 9/2007 | Lu et al. | |
| 2007/0280245 A1 | 12/2007 | Rosberg | |
| 2007/0280277 A1 | 12/2007 | Lund | |
| 2008/0025290 A1 | 1/2008 | Barkai | |
| 2008/0198867 A1 | 8/2008 | Moll et al. | |
| 2008/0212472 A1 | 9/2008 | Musacchio et al. | |
| 2008/0240154 A1* | 10/2008 | Oved | 370/466 |
| 2008/0259798 A1 | 10/2008 | Loh et al. | |
| 2008/0259936 A1 | 10/2008 | Hussain et al. | |
| 2009/0109968 A1 | 4/2009 | Noy et al. | |
| 2009/0122702 A1 | 5/2009 | Chew et al. | |
| 2010/0017535 A1* | 1/2010 | Aloni et al. | 709/235 |
| 2010/0046368 A1 | 2/2010 | Kaempfer et al. | |
| 2010/0054117 A1 | 3/2010 | Southworth et al. | |
| 2010/0118728 A1 | 5/2010 | Prudent | |
| 2010/0161855 A1* | 6/2010 | Mohamed et al. | 710/56 |
| 2010/0202295 A1 | 8/2010 | Smith et al. | |
| 2010/0214913 A1 | 8/2010 | Kompella | |
| 2011/0110373 A1 | 5/2011 | Ghosh et al. | |
| 2013/0194929 A1 | 8/2013 | Kaempfer et al. | |
| 2013/0266016 A1 | 10/2013 | Noy et al. | |
| 2013/0301412 A1 | 11/2013 | Weiss et al. | |

FOREIGN PATENT DOCUMENTS

| | | |
|---|---|---|
| WO | WO 2008/129790 | 10/2008 |
| WO | WO 2009/057109 | 5/2009 |
| WO | WO 2010/020988 | 2/2010 |

OTHER PUBLICATIONS

Written Opinion Dated Mar. 9, 2009 From the International Searching Authority Re.: Application No. PCT/IL2008/001424.
Communication Relating to the Results of the International Search Dated Nov. 20, 2009 From the International Searching Authority Re.: Application No. PCT/IL2009/000810.
International Search Report and the Written Opinion Dated Mar. 10, 2010 From the International Searching Authority Re.: Application No. PCT/IL2009/000810.
International Search Report Dated Nov. 2, 2007 From the International Searching Authority Re.: Application No. PCT/IL06/01476.
Official Action Dated May 11, 2009 From the US Patent and Trademark Office Re.: U.S. Appl. No. 11/615,977.
Official Action Dated Jan. 19, 2010 From the US Patent and Trademark Office Re.: U.S. Appl. No. 11/615,977.
Written Opinion Dated Nov. 2, 2007 From the International Searching Authority Re.: Application No. PCT/IL06/01476.
Bitar "Applicability of Access Node Control Mechanism to PON Based Broadband Networks", known as draft-bitar-wadhwa-ancp-pon-01.
U.S. Appl. No. 11/615,977, filed Dec. 24, 2006, Sharon Barkai.
Response Dated Apr. 19, 2010 to Official Action of Jan. 19, 2010 From the US Patent and Trademark Office Re.: U.S. Appl. No. 11/615,977.
Official Action Dated Apr. 23, 2010 From the US Patent and Trademark Office Re.: U.S. Appl. No. 11/927,861.
International Preliminary Report on Patentability Dated May 14, 2010 From the International Bureau of WIPO Re. Application No. PCT/IL2008/001424.
Supplementary European Search Report and the European Search Opinion Dated May 31, 2010 From the European Patent Office Re. Application No. 06821659.7.
Communication Pursuant to Rule 70(2) and 70a(2) EPC Dated Jun. 17, 2010 From European Patent Office Re. Application No. 06821659.7.
Official Action Dated Aug. 4, 2010 From the US Patent and Trademark Office Re.: U.S. Appl. No. 11/615,977.
Supplementary European Search Report and the European Search Opinion Dated Oct. 26, 2010 From the European Patent Office Re. Application No. 08845163.8.
Bianco et al. "Multistage Switching Architectures for Software Routers", IEEE Network, XP011188056, 21(4): 15-21, Jul. 1, 2007. p. 18, l-h col., Line 19—p. 21, l-h col., Line 34, Fig.4.
Response Dated Jan. 10, 2011 to Official Action of Oct. 12, 2010 From the US Patent and Trademark Office Re.: U.S. Appl. No. 12/195,490.
International Search Report and the Written Opinion Dated Apr. 6, 2011 From the International Searching Authority Re. Application No. PCT/IL2010/001074.
Response Dated Apr. 11, 2011 to Official Action of Jan. 10, 2011 From the US Patent and Trademark Office Re.: U.S. Appl. No. 11/615,977.
Official Action Dated Oct. 12, 2010, From the US Patent and Trademark Office Re.: U.S. Appl. No. 12/195,490.
Response Dated Oct. 21, 2010 to Official Action of Aug. 4, 2010 From the US Patent and Trademark Office Re.: U.S. Appl. No. 11/615,977.
Official Action Dated Jan. 10, 2011 From the US Patent and Trademark Office Re.: U.S. Appl. No. 11/615,977.
International Preliminary Report on Patentability Dated Mar. 3, 2011 From the International Bureau of WIPO Re.: Application No. PCT/IL2009/000810.
Bianco et al. "Multistage Switching Architectures for Software Routers", IEEE Network, XP011188056, 21(4): 15-21, Jul./Aug. 2007. p. 18, l-h col., Line 19—p. 21, l-h col., Line 34, Fig.4.
Official Action Dated Mar. 15, 2011 From the US Patent and Trademark Office Re.: U.S. Appl. No. 12/195,490.
Response Dated Jun. 15, 2011 to Official Action of Mar. 15, 2011 From the US Patent and Trademark Office Re.: U.S. Appl. No. 12/195,490.
Response Dated Sep. 27, 2011 to International Search Report and the Written Opinion of Apr. 6, 2011 From the International Searching Authority Re. Application No. PCT/IL2010/001074.
Official Action Dated Jul. 28, 2011 From the US Patent and Trademark Office Re.: U.S. Appl. No. 11/615,977.
International Preliminary Report on Patentability Dated Mar. 6, 2012 From the International Preliminary Examining Authority Re. Application No. PCT/IL2010/001074.
Official Action Dated Apr. 25, 2012 From the US Patent and Trademark Office Re. U.S. Appl. No. 12/647,145.

(56) References Cited

OTHER PUBLICATIONS

Official Action Dated Dec. 12, 2012 From the US Patent and Trademark Office Re.: U.S. Appl. No. 12/195,490.
Notice of Allowance Dated Nov. 15, 2012 From the US Patent and Trademark Office Re. U.S. Appl. No. 12/647,145.
Communication Under Rule 71(3) EPC Dated Dec. 6, 2012 From the European Patent Office Re. Application No. 08845163.8.
Official Action Dated Jul. 30, 2012 From the US Patent and Trademark Office Re. U.S. Appl. No. 12/195,490.
Notice of Allowance Dated Mar. 19, 2013 From the US Patent and Trademark Office Re.: U.S. Appl. No. 12/195,490.
Official Action Dated Mar. 11, 2013 From the US Patent and Trademark Office Re.: U.S. Appl. No. 11/615,977.
Official Action Dated Jan. 31, 2012 From the US Patent and Trademark Office Re.: U.S. Appl. No. 11/615,977.
Official Action Dated May 21, 2014 From the US Patent and Trademark Office Re. U.S. Appl. No. 13/795,172.
Official Action Dated Oct. 21, 2013 From the US Patent and Trademark Office Re. U.S. Appl. No. 11/615,977.
Official Action Dated Aug. 5, 2014 From the US Patent and Trademark Office Re. U.S. Appl. No. 11/615,977.

\* cited by examiner

GRID ROUTER

FIELD OF THE INVENTION

The present invention relates to network routers generally and to grid routers in particular.

BACKGROUND OF THE INVENTION

Communications networks are ubiquitous. The Internet is everywhere and carriers are attempting to provide more and more services over it to their customers.

U.S. patent application Ser. No. 11/615,977, assigned to the common assignees of the present invention and incorporated herein by reference, describes a metropolitan edge network which attempts to concentrate on the services to be provided rather than on the topology of the network and/or the line configuration. An exemplary metropolitan edge network 40 is shown in FIG. 1, to which reference is now made.

For each service, the metropolitan edge network allocates a mailbox 22 whose size and quality of service (defined by bandwidth, download rates, security control, etc.) may be a function of the amount of data to be transferred there through at any given time. Mailboxes 22 act as buffers, where data may be written in at one end and read out at the other end.

The definition of mailboxes may be straightforward from tables of services that the carriers maintain anyway. Such tables exist for billing, for customer service, for bandwidth allocation, etc. The metropolitan edge network of the present invention may access such tables to define the size and quality of service (QoS) requirements for its mailboxes 22 and may store such information in its own table 30 of services. Metropolitan edge network 40 may also comprise a multiplicity of grid routers 42, of which an exemplary three (with reference letters A, B and C) are shown in FIG. 1. Routers 42 may be connected together with a ring 41.

Each router 42 may comprise an external interface unit (EIU 44 and a mailbox unit (MU) 46. Each external interface unit 44 may provide connections to its associated customers and to ring 41 and each mailbox unit 46 may hold and manage mailboxes 22. However, because metropolitan edge network 40 may be a distributed network, the mailboxes 22 of the associated customers of one external interface unit 44 may not necessarily be stored in the mailbox unit 46 of the same router 42. The location of each mailbox may be a function of the type of service being provided and whether or not it needs to be located near the customer or near the source for efficient operation. Mailbox units 46 may comprise a multiplicity of buffers, for the mailboxes, and management units to add and delete mailboxes as required by the table of services 30.

For each incoming data packet, each external interface unit 44 may determine which mailbox unit 46 may manage the mailbox 22 for the service being transmitted by the data packet. Each external interface unit 44 may perform a hashing function on at least some of the information in a header of the data packet. The resultant hash value may be the mailbox number within metropolitan edge network 40 for the service carried by the data packet. With the mailbox number, the external interface unit 44 may directly write (typically using remote DMA (rDMA)) the data packet to the indicated mailbox 22.

For example, the Smith Family, labeled 50, may request a video on demand from VOD, labeled 52. The Smith Family, labeled 50, may register the request for the service and metropolitan edge network 40 may create a mailbox 22B$_1$ for that service and may allocate an external interface unit 44, such as EIU 44A, for the service as well. VOD 52 may send its VOD datastream to router 42A, the router closest to it. External interface unit 44A may hash the destination address, that of the Smith Family, and may determine that the Smith Family's mailbox for VOD 52, mailbox 22B$_1$, may be located in mailbox unit 46B. Accordingly, external interface unit 44A may write the datastream to mailbox 22B$_1$ in mailbox unit 46B. When the Smith Family's set-top box may connect to router 42B, the router closest to it, mailbox unit 46B may send the packets stored in mailbox 22B$_1$ to the Smith Family's set-top box, via external interface unit 44B.

Another service is that of two people, for example Dana Smith and her friend Ann, talking over VoIP. In this example, Dana Smith's mailbox 22B$_2$ may be located in mailbox unit 46B, close to her house, while Ann's mailbox 22C may be located in a different mailbox unit, for example 46C.

When Ann talks on her VoIP telephone, her computer may send her voice datastream to router 42C, the router with which she is associated. External interface unit 44C may hash the destination address, that of Dana Smith, and may determine that Dana Smith's mailbox for VoIP, mailbox 22B$_2$, may be located in mailbox unit 46B. Accordingly, external interface unit 44C may write the datastream to mailbox 22B$_2$ in mailbox unit 46B and mailbox unit 46B may forward the packets to Dana's VoIP telephone through external interface unit 44B.

SUMMARY OF THE PRESENT INVENTION

There is therefore provided, in accordance with a preferred embodiment of the present invention, a grid router including a plurality of external interface units and a second plurality of mailbox units. The external interface units receive packets of services from one point and provide packets of services to another point.

The mailbox units store and forward the packets associated with mailboxes, one per service, and each mailbox unit is connected to the external interface units in a CLOS-like network. The external interface unit has an input portion and an output portion and the input and output portions and the mailbox units write to each other in a non-synchronous manner.

Moreover, in accordance with a preferred embodiment of the present invention, the input portions write to the mailbox units as per information in the packets, the mailbox units write packets to output portions associated with the mailboxes in which the packets are stored and the output portions write packets to the network.

Further, in accordance with a preferred embodiment of the present invention, each the portion and each mailbox unit includes an incoming section to store the packets and related headers, a processor to process only the headers at least to make routing decisions and an outgoing section, storing at least one pointer to the incoming section, to organize the packets for transfer to the next unit.

Still further, in accordance with a preferred embodiment of the present invention, each incoming section of the input portion is connected to a plurality of network interface cards, each writing directly into the incoming section.

Moreover, in accordance with a preferred embodiment of the present invention, each network interface card includes a user space library and a scatter-gather DMA unit to write the packets from the library to the incoming section.

Additionally, in accordance with a preferred embodiment of the present invention, each outgoing section includes at least one queue storing the pointer(s) to locations in the incoming section.

Moreover, in accordance with a preferred embodiment of the present invention, each outgoing section includes one write queue per unit to be written to.

Further, in accordance with a preferred embodiment of the present invention, the mailbox unit additionally includes a mailbox section storing mailbox queues, each associated with a mailbox. Each the mailbox queue stores pointers to locations in its the incoming section where its data is stored.

Still further, in accordance with a preferred embodiment of the present invention, the processor of the mailbox unit also includes a scheduler for scheduling and controlling the output of the packets.

Moreover, in accordance with a preferred embodiment of the present invention, the processor of the mailbox unit includes a hasher, a rater, a mailbox selector and a dispatcher. The hasher hashes a header of a packet to determine to which mailbox the packet belongs. The rater controls input to the mailbox according to requirements previously defined for the mailbox. The mailbox selector stores pointers to the header and the packet in a mailbox queue associated with the determined mailbox upon instruction from the rater. The dispatcher shapes an output stream from the mailbox and to store the pointers in a write queue previously defined for the mailbox.

Additionally, in accordance with a preferred embodiment of the present invention, the processor of the input portion includes a header creator, a hasher and a mailbox unit selector. The header creator creates a new header with a pointer to the storage location of the packet. The hasher reads the new header and to determine in which mailbox unit to store the packet. The mailbox unit selector writes pointers to the new header and to the storage location in a write queue for the determined mailbox unit.

Further, in accordance with a preferred embodiment of the present invention, the processor of the output portion includes a write requester to update a header of a packet with a destination address of the packet and to write a pointer to the packet into a transmit queue.

There is also provided, in accordance with a preferred embodiment of the present invention, a grid router including a plurality of external interface units and a second plurality of mailbox units. The external interface units receive packets of services from one point and provide packets of services to another point. The mailbox units store and forward the packets associated with mailboxes, one per service, and each mailbox unit is connected to each the external interface unit. The units are implemented on PCs (personal computers) having memory controllers and move the packets therethrough close to or at the I/O (input/output) rate of the memory controllers.

Moreover, in accordance with a preferred embodiment of the present invention, each personal computer includes an incoming section to store the packets and related headers, a processor to process only the headers at least to make routing decisions and an outgoing section, storing at least one pointer to the incoming section, to organize the packets for transfer to the next personal computer.

Further, in accordance with a preferred embodiment of the present invention, the incoming section of an input portion of each of the external interface units is connected to a plurality of network interface cards, each writing directly into the incoming section. The processor of the input portion determines the routing of the packets to one of the mailbox units.

Still further, in accordance with a preferred embodiment of the present invention, the grid router also includes a direct data placement unit to transfer packets from one unit to another. The direct data placement unit can be an rDMA unit, a TCP offload engine, an RDMA enabled network interface card or a DDP enabled network interface card.

Moreover, in accordance with a preferred embodiment of the present invention, the mailbox unit additionally includes a mailbox section storing mailbox queues, each associated with a mailbox. Each mailbox queue stores pointers to locations in its incoming section where its data is stored.

Further, in accordance with a preferred embodiment of the present invention, each external interface unit has an input portion to write to each mailbox unit and an output portion to receive the packets from the mailbox unit. The input and output portions and the mailbox units write to each other in an asynchronous manner.

There is also provided, in accordance with a preferred embodiment of the present invention, a method including converting a non-reliable network of computers into a reliable network by transporting aggregated service traffic with a direct data placement unit.

Moreover, in accordance with a preferred embodiment of the present invention, the direct data placement unit is an rDMA unit, a TCP offload engine, an RDMA enabled network interface card or a DDP enabled network interface card.

There is also provided, in accordance with a preferred embodiment of the present invention, a method including transferring packets and headers, stored in separate memory areas of one personal computer and pointed to in a write queue of the personal computer to separate memory areas of another personal computer via a direct data placement unit at or close to the input/output rate of memory controllers of the computers.

Additionally, in accordance with a preferred embodiment of the present invention, the method also includes processing each the header to determine into which write queue to place a pointer to the header and its associated packet.

Finally, there is provided, in accordance with a further preferred embodiment of the present invention, a method including storing packets and headers of a plurality of mailboxes of a mailbox unit in a general storage area, processing each the header to determine to which mailbox each packet and associated header belong, placing pointers to the packet and its associated header into a mailbox queue for the mailbox and processing the mailbox queue to control the input and output of the mailbox.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
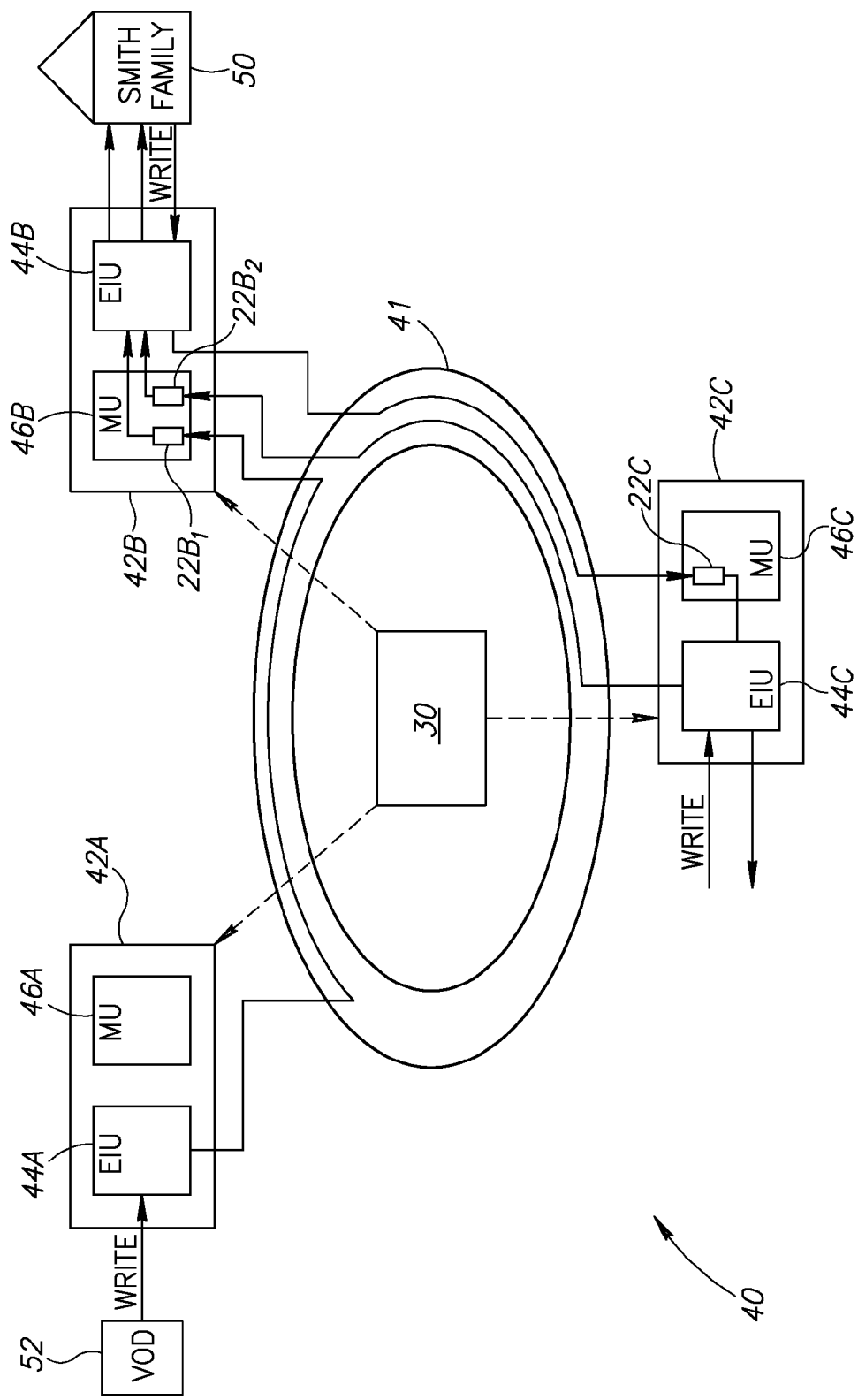
FIG. 1 is a schematic illustration of an metropolitan edge network.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Applicants have realized that, for most implementations, a very large number of mailboxes may need to be accessed. One mailbox unit (MU) may not be sufficient to hold them all.

Figure 2:
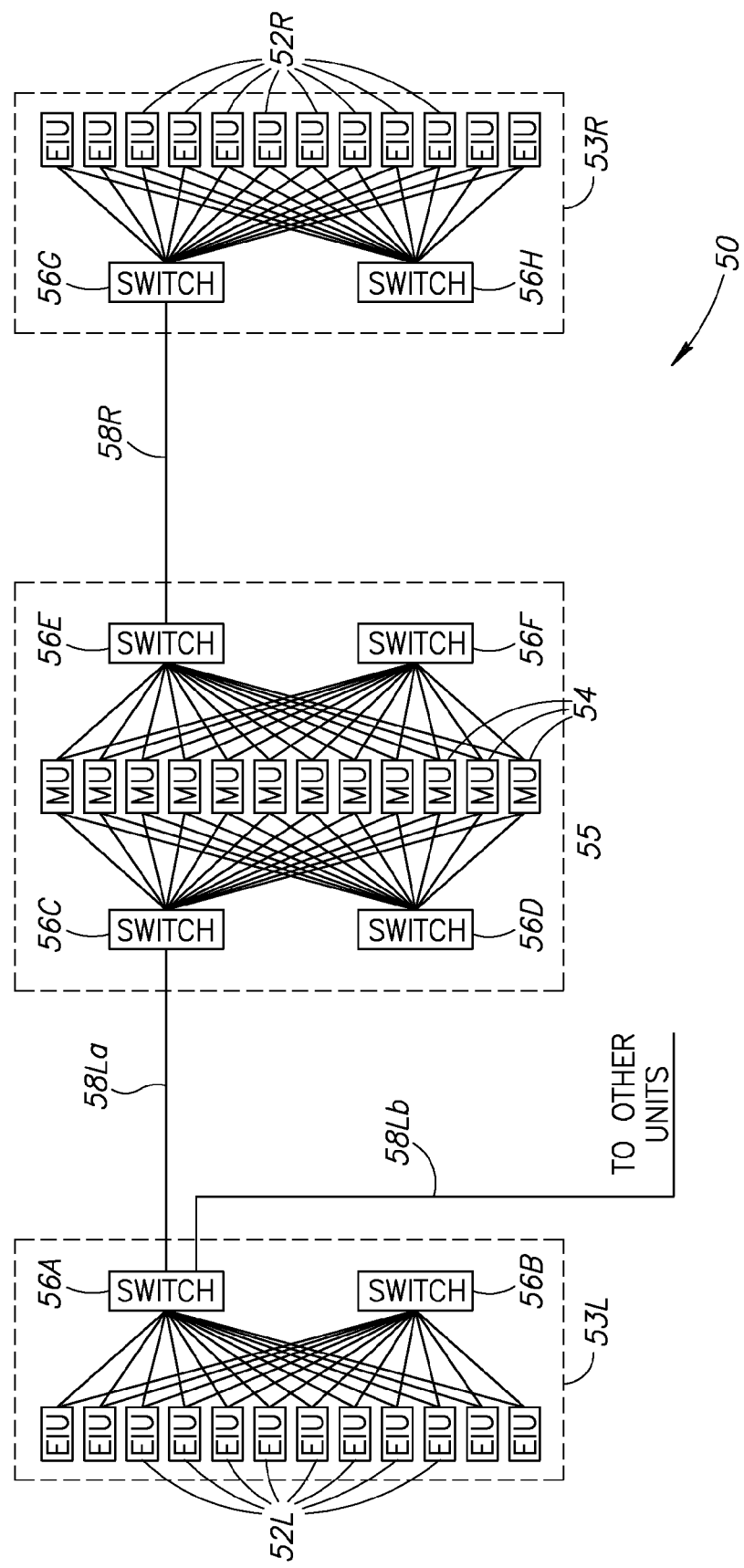
FIG. 2 is a schematic illustration of a novel grid router, constructed and operative in accordance with a preferred embodiment of the present invention.

Reference is now made to FIG. 2, which illustrates a novel grid router 50, constructed and operative in accordance with a preferred embodiment of the present invention, which comprises a multiplicity of mailbox units MU 54. In accordance with a preferred embodiment of the present invention, mailbox units MU 54 may be connected on one side to left external interface units (EIUs) 52L and on the other side to right external interface units EIUs 52R.

In accordance with a preferred embodiment of the present invention, units 52 and 54 may be connected in a Clos-like network, through which each mailbox unit 54 may be connected with each EIU 52. Thus, each mailbox unit 54 may be accessed by each external interface unit 52 at the same time.

This may help router 50 to operate at a full rate and load balanced (i.e. any received packet may be placed into a mailbox and any packet in a mailbox may be read out). There is little or no congestion, at least in part due to the fact that the hashing process spreads the traffic relatively evenly among mailbox units 54 and to the fact that all mailbox units 54 are accessible from all EIUs 52.

If a metropolitan edge network requires only one router 50, then external interface units EIU 52 may be directly connected to mailbox units 54. However, if the metropolitan edge network requires more than one router 50, then, in accordance with a preferred embodiment of the present invention, router 50 also comprises switches 56 which aggregate output from EIUs 52 and MUs 54 onto high-speed links 58, such as 10G Ethernet. There are two sets of links 58L and 58R, on the left and right sides of mailbox units 54.

For example, in FIG. 2 there are 12 left EIUs 52L housed in a EIU chassis 53L, 12 mailbox units 54 housed in a mailbox chassis 55, and 12 right EIUs 52R housed in a right EIU chassis 53R. Each EIU chassis 53 houses two switches (for left EIU chassis 53L, switches 56A and 56B are on the output, while for right EIU chassis 53R, switches 56G and 56H are on the input). Mailbox chassis 55 houses four switches, two (56C and 56D) on the left and two (56E and 56F) on the right.

Switch 56A aggregates the output of EIUs 52L onto link 58La which, in this example, is a 10 Gbps link. Link 58L a connects to switch 56C which, in turn, connects to all 12 mailbox units 54. Switch 56E aggregates the output of mailbox units 54 onto link 58R which connects to switch 56G. Switch 56G connects to all ELUs 52R. Switches 56B, 56D, 56F and 56H connect to other mailbox chasses 55 forming part of other routers 50.

Each link 58 connects between 12 EIUs 52 and 12 mailbox units 54 and thus, carries 12×12=144 connections. Each connection thus has a bit rate of 10 Gbps/144 or about 70 Mbps. At any given time, 144 packets may arrive at any of switches 56 (written to them by the rDMA units). During the time that they arrive, 12 packets may be switched to their destination. Thus, 144−12=132 packets may collide at any given time. This is a relatively low number of packets considering the speed of the connections.

With such a low number of collisions, grid router 50 may have few packet drops and relatively little jitter and thus, a relatively high quality of service. The minimal collision rate also enables switches 56 to be much simpler, since the traffic is relatively balanced, with few, if any bursts.

Applicants have further realized that each mailbox operates uni-directionally. That is, a service provider sends data to his external interface unit, which, in turn, writes the data into the mailbox associated with the service. The subscriber's external interface unit takes the data out of the mailbox and sends it to the subscriber. The present invention may be a non-synchronous grid router that separately writes to and from a plurality of mailboxes, but at a relatively high speed and with a relatively high quality of service.

Figure 3C:
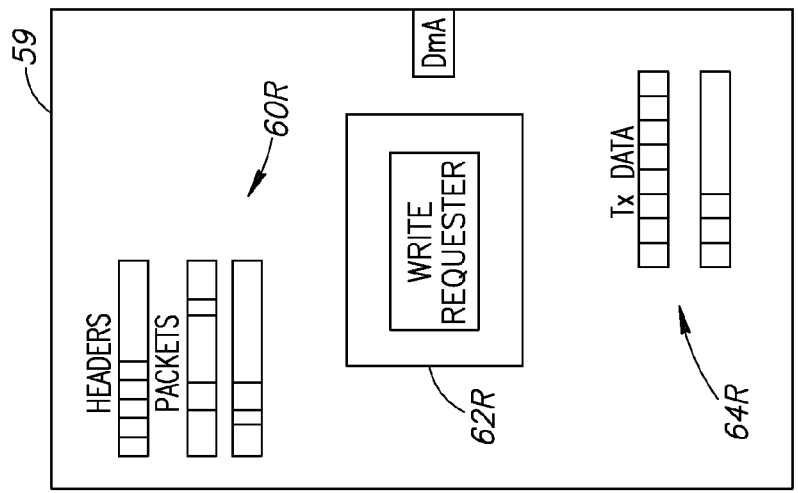
FIGS. 3A, 3B and 3C are schematic illustrations of an input portion of an external interface unit, a mailbox unit and an output portion of external interface unit, respectively, forming part of the grid router of FIG. 2.
Figure 3B:
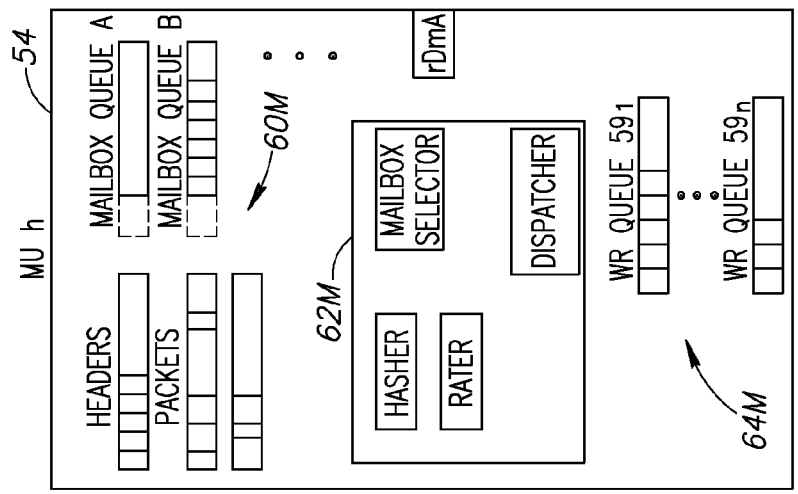
Figure 3A:
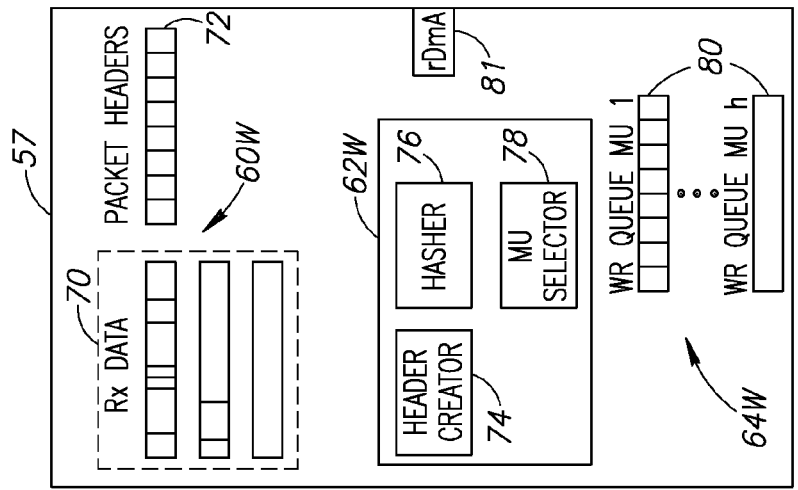

Reference is now made to FIGS. 3A, 3B and 3C, which respectively illustrate the elements of grid router 50, and to FIGS. 4A, 4B, 4C and 4D which illustrate its operation. In accordance with a preferred embodiment of the present invention, each external interface unit EIU 52 has two sections, an input section 57 and an output section 59, which separately write to and from the mailbox units 54, respectively.

Each unit 54, 57 and 59 may be implemented on standard PC (personal computer) hardware, in particular having the X86 architecture. Such architecture has a central processing unit (CPU), a RAM (random access memory), a memory controller to read and write the data from the RAM to the CPU and a smaller amount of operating memory ("cache") readily available to the CPU.

Each unit 54, 57 and 59 may have an incoming data section 60, a central processing unit (CPU) 62 and an outgoing data section 64. Each incoming data section 60 may receive packets written into it, each CPU 62 may perform relatively simple processes to determine how and where to forward the packets and each outgoing data section 64 may write the packets to the next unit. This structure may enable router 50 to operate at or close to its maximum input/output rate, as defined by the rate of operation of its memory controller, since, as discussed hereinbelow, CPUs 62 are not involved in moving data from one memory location to another.

Input section 57 may comprise a data storage area 70 and a packet header storage area 72 in its incoming data section 60W. Running on CPU 62W may be a header creator 74, a hasher 76 and a mailbox unit selector 78 and outgoing data section 64W may comprise a multiplicity of write queues 80, one per mailbox unit 54, and an rDMA unit 81.

Figure 4A:
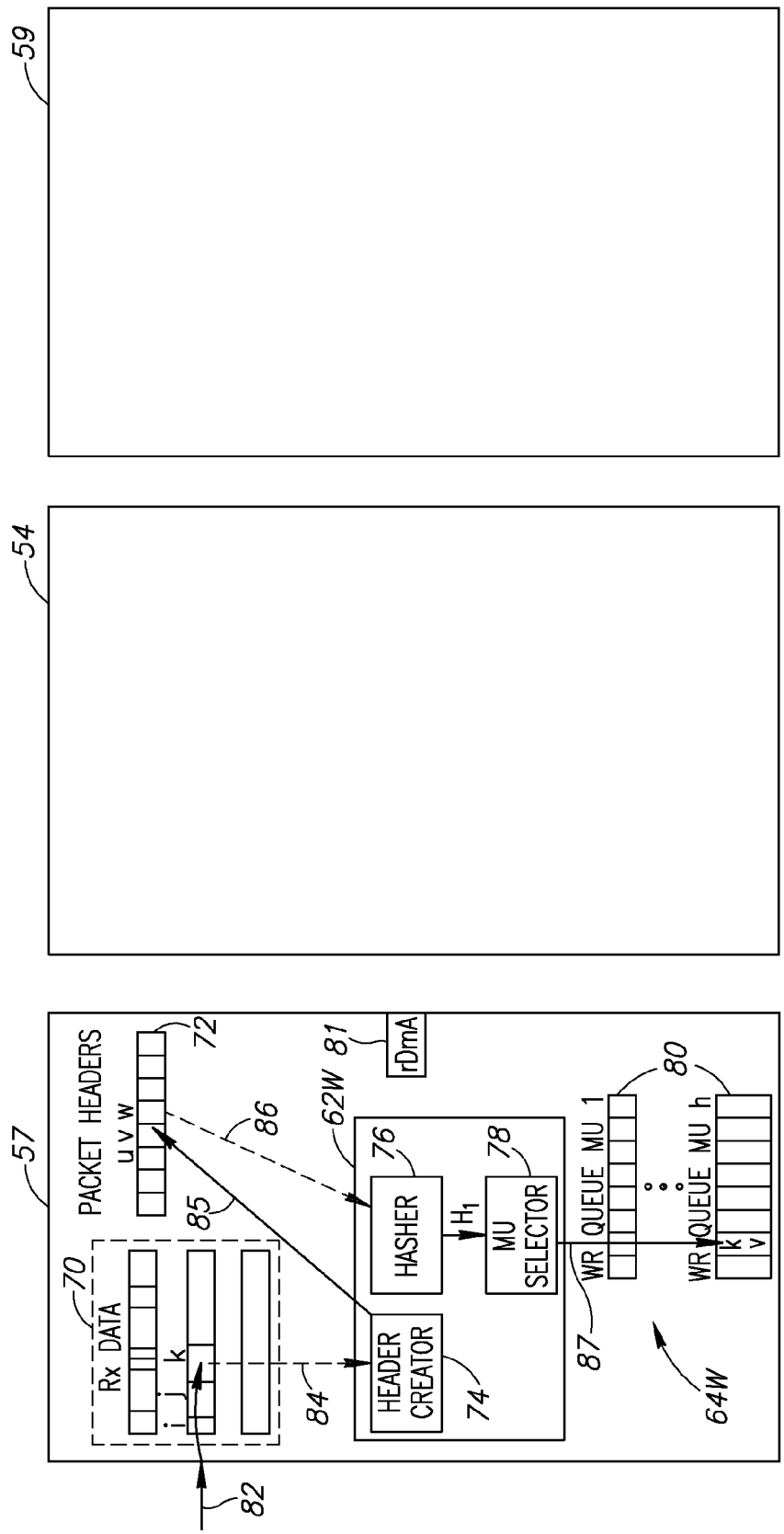
FIGS. 4A, 4B, 4C, 4D, and 4E are schematic illustrations of the movement of data through the elements of FIGS. 3A, 3B and 3C.

As shown in FIG. 4A, data may be written (arrow 82) into data storage area 70, typically into an available memory section, such as section k. This write operation may occur whenever a network interface card (NIC) (not shown) may have data to be written. The (NIC) may write to memory section k using a "scatter gather" operation. The NIC may be modified, through its "user-space library", to write the scatter gather list directly into the next available location in data storage area 70, in a DMA type operation. Since the incoming data may be a packet and since packets may be of varying lengths, each memory section may be identified by the location of its first bit.

Packets typically comprise headers and footers, with data in-between, where the headers typically minimally include the addresses of the source and destination devices and the type of service carried in the packet. Header creator 74 may read (arrow 84) the header in its entirety and may create a new header, which adds a pointer to memory section k into the original header. Header creator 74 may store (arrow 85) the new header in packet header storage area 72, in an exemplary bin v. Each bin in storage area 72 may be relatively small, compared to the memory sections of data storage area 70, and the bins may be of generally the same size.

Hasher 76 may review the headers stored in storage area 72, taking each one in turn. It may read (arrow 86) each header, such as the header stored in bin v, and may generate a hash value $H_1$ from the data stored therein. The hash value $H_1$ may indicate into which mailbox unit 54 to transfer the packet. As discussed in U.S. patent application Ser. No. 11/615,977, the hash input may vary depending on the type of service carried by the packet. Typically, the packet may include an indication of the type of service carried therein.

Mailbox unit selector 78 may update the next destination address of the header to that of the selected mailbox unit 54, may add hash value $H_1$, and may write (arrow 87) pointers to the packet and to the updated header into the write queue 80 for the mailbox unit MU indicated by hash value $H_1$. For example, mailbox unit selector 78 may write pointers k and v into write queue 80 for mailbox unit MUh. Each bin in queues 80 may be quite small as they only store two pointers, one to the packet and one to the updated header.

Figure 4B:
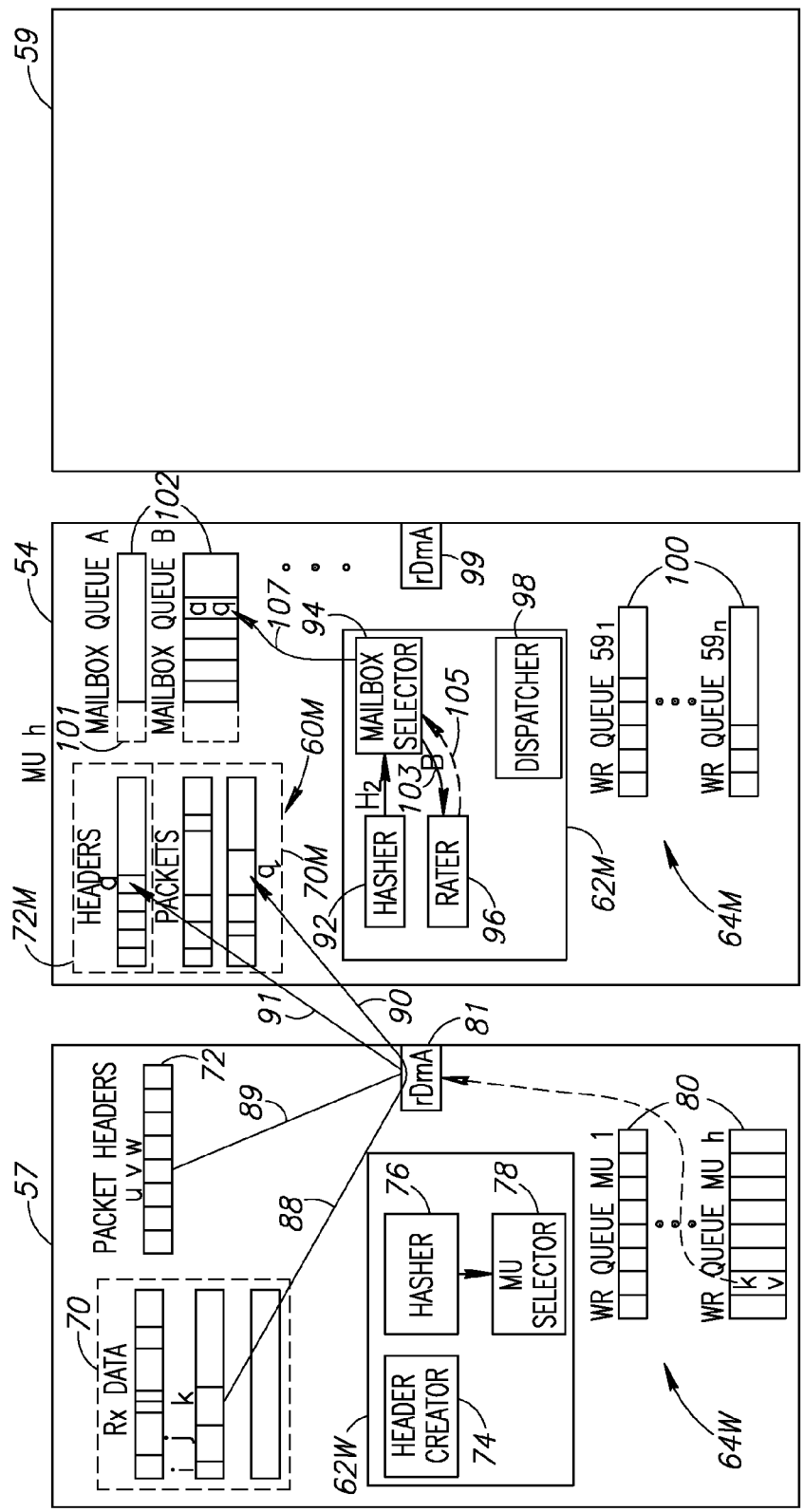
Figure 4C:
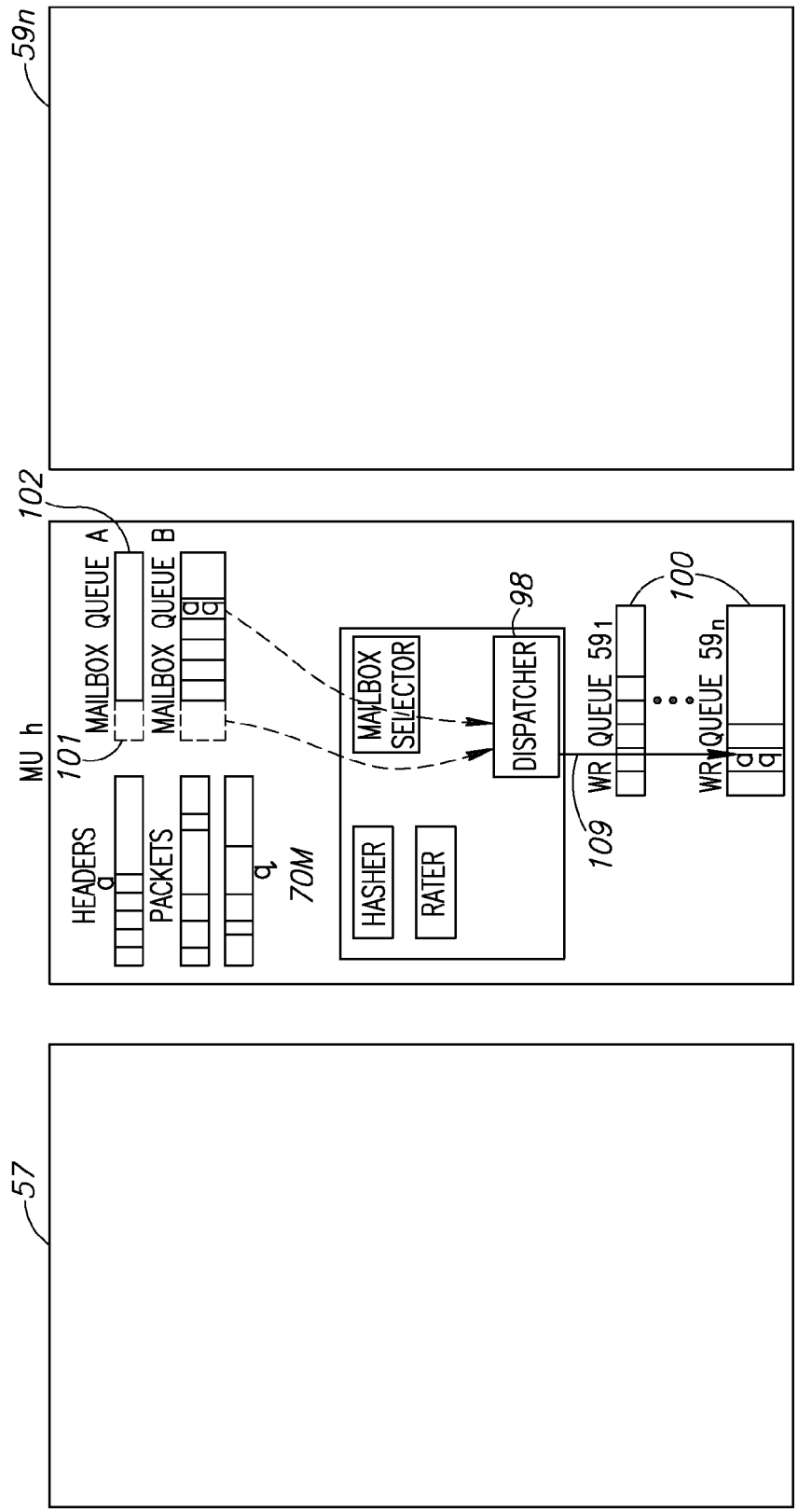

Turning to FIG. 4B, rDMA unit 81 may read each write queue 80 in a round robin fashion (i.e. one packet from one queue, one packet from the next queue, etc). For each queue 80, rDMA unit 81 may access the next bin of the queue and may read the two pointers (e.g. k and v) stored therein. rDMA unit 81 may then access (arrow 88) the packet stored at the packet address (e.g. k) and may access (arrow 89) the header stored at the header address (e.g. v) and may write them, as per the added destination address, into the next available packet and header storage in the mailbox unit MU associated with the write queue. It will be appreciated that rDMA unit 81 typically may operate as data becomes available for writing; it is not synchronized with the NIC writing into incoming data section 70.

For example, write queue MUh may be associated with mailbox unit MUh and thus, rDMA 81 may write (arrow 90) the packet stored in memory section k to a memory section, such as memory section q, in packet storage area 70M of mailbox unit MUh and may write (arrow 91) the header stored in bin v to a bin, such as bin a, in a header storage area 72M of mailbox unit MUh. Before writing the header into its bin (e.g. bin a), rDMA 81 may update the header to include the new memory section (e.g. q) of the packet.

Incoming data section 60M of each mailbox unit 54 may comprise packet storage area 70M and header storage area 72M. As for input sections 57, packet storage area 70M may have varying size, memory sections while header storage area 72M may have fixed size bins.

Running on CPU 62M may be a hasher 92, a mailbox selector 94, a rater 96 and a dispatcher 98. Outgoing data section 64M may comprise a multiplicity of write queues 100, one per output section 59, and an rDMA unit 99.

In addition, each mailbox unit 54 may comprise a multiplicity of mailbox queues 102. These queues 102 may represent mailboxes 22 but, in accordance with a preferred embodiment of the present invention, do not store the data themselves; instead, they store pointers to the headers and data stored in incoming data section 60M. Accordingly, each mailbox queue 102 may be quite small. It will be appreciated that, by having separate queues 102 for each mailbox, rather than storing the packets in their mailboxes, enable the queues to be very small and thus, may relatively easily be stored either in random access memory or in cache memory for fast processing.

Hasher 92 may read the headers in order, hashing the original hash data of each header to determine to which mailbox queue 102 to associate the packets. Hasher 92 may provide a hash value $H_2$ to mailbox selector 94 which, in turn, may select the mailbox queue 102 indicated by hash value $H_2$. Mailbox selector 94 may provide (arrow 103) the mailbox value, here listed as B, to rater 96 to determine how to handle the incoming packet.

Rater 96 may control access to mailbox queue 102 based on the quality of service or other channel requirements for that mailbox. Such requirements may be associated with each mailbox 22 (indicated in FIG. 4B by dashed lines 101 at one end of mailbox queue 102) and may be available for review by rater 96. Other information, such as open accounting, security, session chain, etc., may also be associated with each mailbox queue 102, as well as the output section 59 through which to transmit the packets to their destination, and the original destination address.

Rater 96 may attempt to maintain a preset traffic rate for the current mailbox. Rater 96 may throw away any incoming packets when current mailbox queue 102 may be full. Throwing such packets away may allow TCP-like protocols to synchronize on the appropriate rate for that mailbox. The maximum mailbox size may be defined either by number of packets, measured through a packet counter, or by the total size of the packets.

Mailbox queue 102 may be a cyclic queue and thus, rater 96 may determine that mailbox queue 102 may be full when a pointer to the head of mailbox queue 102 is near a pointer to the tail of mailbox queue 102. When rater 96 may throw away a packet, rater 96 may increase a 'dropped packet' counter for that mailbox. Rater 96 may provide (arrow 105) its instructions back to mailbox selector 94 which, if the packet wasn't to be dropped, may write (arrow 107) pointers to the header and packet addresses into the next available bin of selected mailbox queue 102. In the exemplary embodiment of FIG. 4B, these addresses are a and q, respectively.

Dispatcher 98 may review (FIG. 4C) each mailbox queue 102 to determine the rate at which to extract packets from it and to shape the output stream. Dispatcher 98 may utilize a shaping algorithm, such as the "leaky bucket" algorithm, as is known in the art, which extracts packets from a queue while complying with the QOS/shaping parameter defined for each mailbox. It will further be appreciated that other shaping formulas may also be utilized in the present invention.

When dispatcher 98 may determine that a packet may be ready for releasing from a current mailbox, dispatcher 98 may update the header with the destination address of the output section 59 associated with current mailbox queue 102. Dispatcher 98 may copy (arrow 109) the pointer information stored in the bin currently at the head of mailbox queue 102 to the write queue 100 associated with mailbox queue 102. FIG. 4B shows that the output section labeled 59n is the one associated with the exemplary mailbox queue 102.

Figure 4D:
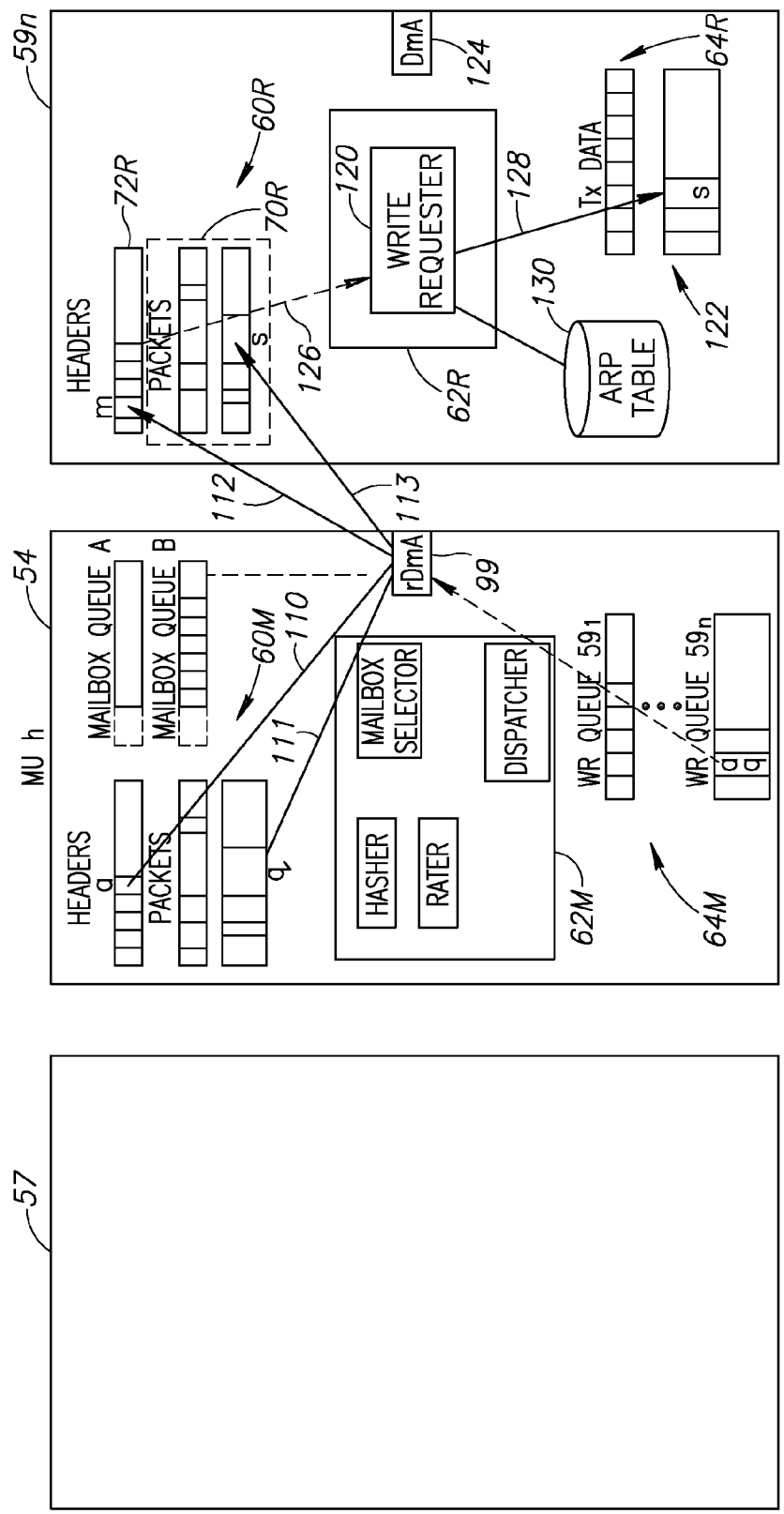

Turning to FIG. 4D, rDMA unit 99 may read each write queue 100 in a round robin fashion. For each queue 100, rDMA unit 99 may access the next bin of the queue and may read the two pointers (e.g. a and q) stored therein. rDMA unit 99 may then access (arrow 110) the header stored at the header address (e.g. a) and may access (arrow 111) the packet stored at the packet address (e.g. q) and may write them, as per the updated destination address, into the next available header and packet storage in the output section 59 associated with the write queue.

For example, write queue 59n may be associated with output section 59n and thus, rDMA 102 may write (arrow 112) the header stored in bin a to a bin, such as bin m, in a header storage area 72R of output section 59n and may write (arrow 113) the packet stored in memory section q to a memory section, such as memory section s, in packet storage area 70R of output section 59n. Before writing the header into its bin (e.g. bin m), rDMA 102 may update the header to include the new memory section (e.g. s) of the packet. It will be appreciated that rDMA unit 99 typically may operate as data becomes available for writing it is not synchronized with rDMA unit 81 (FIG. 4B) or any other writing unit.

Incoming data area section 60R of each output section 59 may comprise packet storage area 70R and header storage area 72R. Like in the other units, packet storage area 70R may have varying size, memory sections while header storage area 72R may have fixed size bins.

Running on CPU 62R may be a write requester 120. Outgoing data section 64R may comprise a single transmit queue 122 and a DMA unit 124

Write requester 120 may review (arrow 126) each new header, checking the original destination address and may lookup the next destination address for that original destination address in its local copy of the ARP table, labeled 130. Write requester 120 may update the header stored in the packet to include the MAC address for the next destination for the packet (i.e. the external destination) and may write (arrow 128) a pointer to the packet address into the next available bin of transmit queue 122. In the exemplary embodiment of FIG. 4D, this address is s.

Figure 4E:
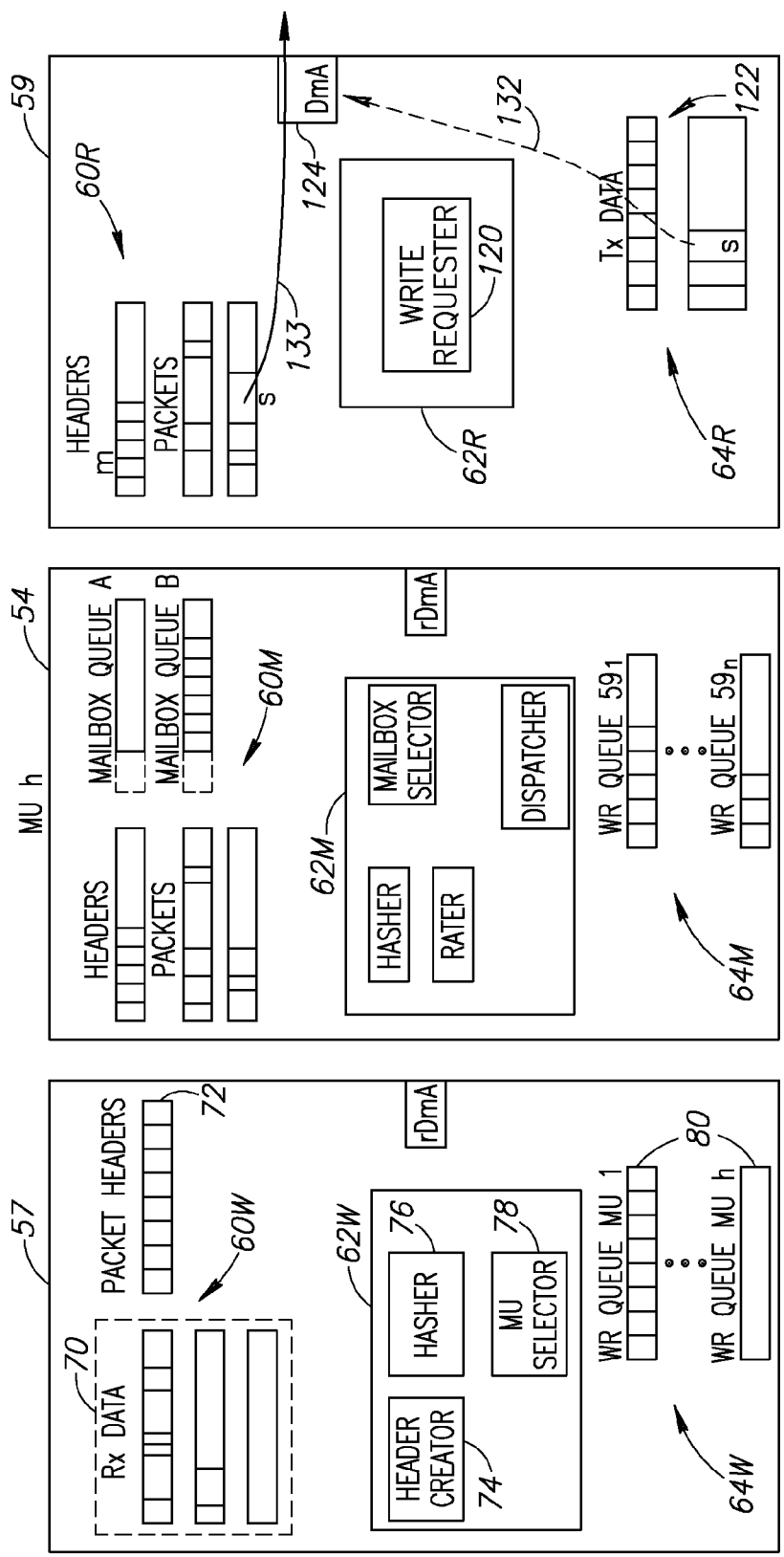

Turning to FIG. 4E, DMA unit 124 may access the next bin of transmit queue 122 and may read the pointer (e.g. s) stored therein. DMA unit 124 may then access (arrow 132 and arrow 133) the packet stored at the packet address (e.g. s) and may write it, as per the updated destination address, out to the network. It will be appreciated that DMA unit 124 typically may operate as data becomes available for writing; it is not synchronized with rDMA unit 81 or 99.

It will be appreciated that router 50 (FIG. 2) may write the packet only once per unit, performing all of its processing on the separately stored headers of the packets. Moreover, by filling the transmit queues and the mailboxes with pointers rather than the actual data, router 50 minimizes read and write operations. In fact, the CPUs 62 do not copy data from one place to another in memory and, as a result, they process the data much faster. CPUs 62 merely review the headers, a relatively small amount of data that may be cached in working memory and processed relatively quickly.

Furthermore, the input and output are separated, such that a mailbox may be written to and from at the same time. Moreover, the input and output operations are not necessarily synchronized; they occur whenever data is available in the various write queues. Despite that, grid router 50 may move data through it quickly.

It will be appreciated that the rDMA and DMA units make transporting aggregated service traffic from one unit of router 50 to another unit reliable. The rDMA protocol is a reliable protocol with flow control and, as a result, does not generate collisions. It will further be appreciated that the present invention may use other direct data placement protocols which support direct host memory access and give the operating system access to data received from the network without performing any CPU based memory copy. Examples of other types of direct data placement units may be TCP offload engines, RNIC (RDMA enabled NIC), DDP enabled NICs, and other offload engines.

Figure 5:
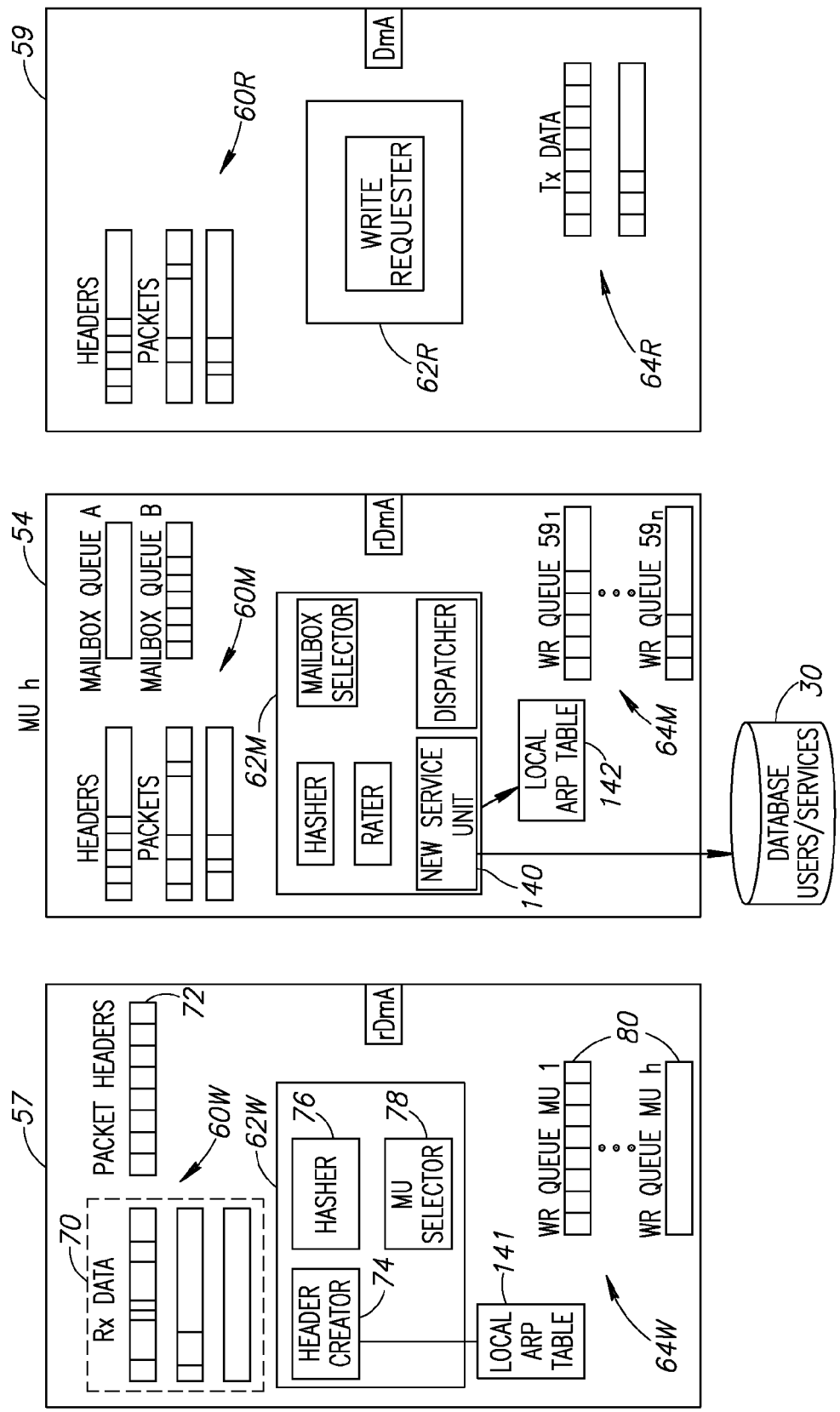
FIG. 5 is a schematic illustration of the operation of the elements of FIGS. 3A, 3B and 3C in registering a new mailbox.

It is noted that the flow above is operative for existing services. Reference is now made to FIG. 5, which illustrates the process for a new packet. When a new packet arrives to a input section 57, header creator 74 may check the source address to see if the service represented is known. In one embodiment, header creator 74 may check a local ARP (address registration process) table 141. If the service exists, header creator 74 may send the source address an "ARP reply". However, if the service is not listed in the ARP table, header creator 74 may start a new mailbox registration process. First, header creator 74 may request that hasher 76 calculate the hash value $H_1$ from the data in the packet. Based on the hash results, mailbox unit selector 78 may determine the mailbox unit 54 for the service and may send a Mailbox Registration command, which may include a reference to the service identification and to an identifier of input section 57, to the selected mailbox unit 54.

A new service unit 140 may receive the Mailbox Registration command and may issue a request to table 30 (FIG. 1) of services and users. With the reply from table 30, new service unit 140 may generate a new mailbox 22 having the parameters of the service received from table 30 and having an appropriate hash value generated according to the formula for that type of service. New service unit 140 may also determine the output section 59, typically from a hash of the source address, and may store that, as well as the source address listed in the packet, in a local ARP table 142.

New service unit 140 may send an acknowledgement back to header creator 74 of input section 57 which, in turn, may send an ARP reply to the source address.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of forwarding traffic over a distributed edge network, the method comprising:
   providing a grid router in said distributed edge network for forwarding said traffic over said distributed edge network, said grid router comprising Clos connectivity;
   at said grid router:
   assigning mailboxes to given end users respectively, said mailboxes having locations on said distributed network which are functions respectively of a type of service being provided and a corresponding end user;
   storing packets and headers of a plurality of mailboxes of a mailbox unit in a general storage area;

processing each said header to determine to which end user and to which respective mailbox each packet and associated header belong;

placing pointers to said packet and its associated header into a mailbox queue for said respective mailbox; and processing said mailbox queue to control the input and output of said respective mailbox, wherein said processing said mailbox queue comprises transferring packets and headers, stored in said general storage area respectively of one personal computer and pointed to in said mailbox queue of said personal computer, to separate general storage areas of another personal computer via a direct data placement unit, wherein packets are written from input portions of external interface units of said grid router to a corresponding mailbox as per information in said packet headers, the method further comprising allowing reading of said packets from said mailbox units to output portions of said external interface unit of said grid router respectively associated with said mailboxes in which said packets are stored, thereby separating writing of packets into said mailbox from wading of said packets by said end users, and from said output portions sending said packets to a location associated with said corresponding end user.

2. The method of claim 1, further comprising:

converting a non-reliable network of computers into a reliable network by transporting aggregated service traffic using said direct data placement unit.

3. The method according to claim 2 and wherein said direct data placement unit is one of: an rDMA unit, a TCP offload engine, an RDMA enabled network interface card and a DDP enabled network interface card.

4. The method according to claim 1, and also comprising:

processing each said header to determine into which write queue to place a pointer to said header and its associated packet.

* * * * *